K. E. PEILER.
GLASS FEEDING APPARATUS.
APPLICATION FILED DEC. 30, 1916.

1,401,921.

Patented Dec. 27, 1921.

2 SHEETS—SHEET 1.

Witness
S. S. Grotta

Inventor
Karl E. Peiler
by Wm H Honiss
Atty

K. E. PEILER.
GLASS FEEDING APPARATUS.
APPLICATION FILED DEC. 30, 1916.
1,401,921.
Patented Dec. 27, 1921.
2 SHEETS—SHEET 2.
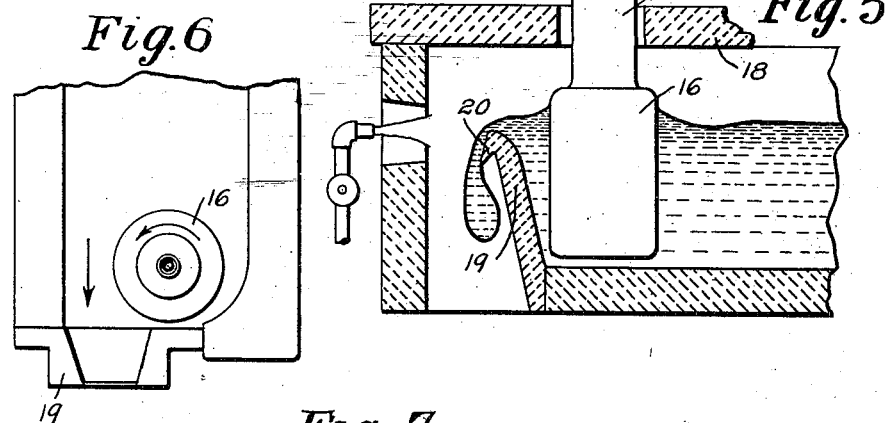
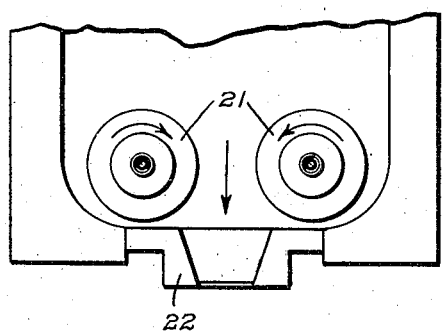
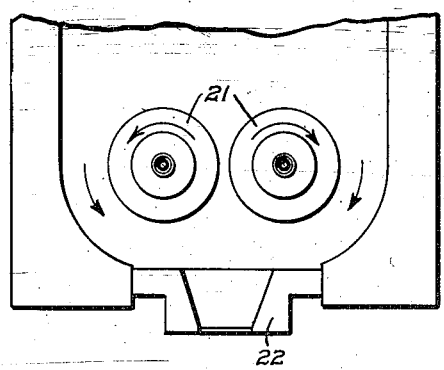
Witness
S. S. Grotta
Inventor
Karl E. Peiler
by W. H. Honiss
Atty

UNITED STATES PATENT OFFICE.

KARL E. PEILER, OF HARTFORD, CONNECTICUT, ASSIGNOR TO HARTFORD-FAIRMONT COMPANY, OF CANAJOHARIE, NEW YORK, A CORPORATION OF NEW YORK.

GLASS-FEEDING APPARATUS.

1,401,921.  Specification of Letters Patent.  Patented Dec. 27, 1921.

Application filed December 30, 1916. Serial No. 139,767.

*To all whom it may concern:*

Be it known that I, KARL E. PEILER, a citizen of the United States, residing at Hartford, in the county of Hartford and State of Connecticut, have invented new and useful Improvements in Glass-Feeding Apparatus, of which the following is a specification.

This invention relates to apparatus for separating at regular intervals uniform masses of molten glass for subsequent shaping operations. Its principal element is a rotatable propeller which is partly or wholly submerged in the glass supply and by its rotary movements advances the desired amounts of molten glass at the required intervals over a dam, lip or spout of the discharge trough or forehearth of the furnace, melting pot or other container. The object of the invention is to provide a simple, durable, mechanically operated apparatus which will discharge at the desired intervals the required quantities of molten glass in suitable condition for subsequent use.

Figure 1:
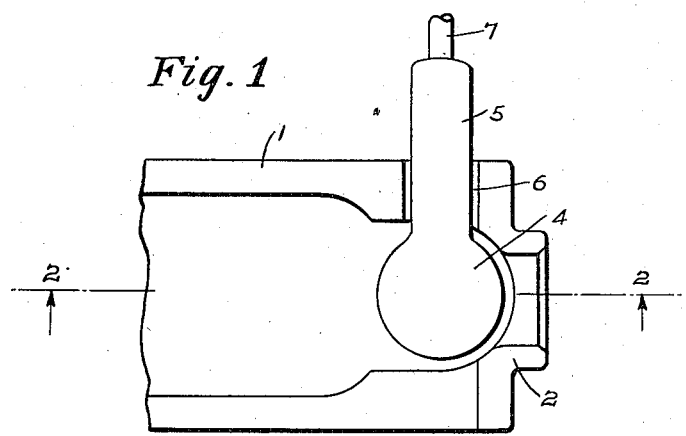
Figure 2:
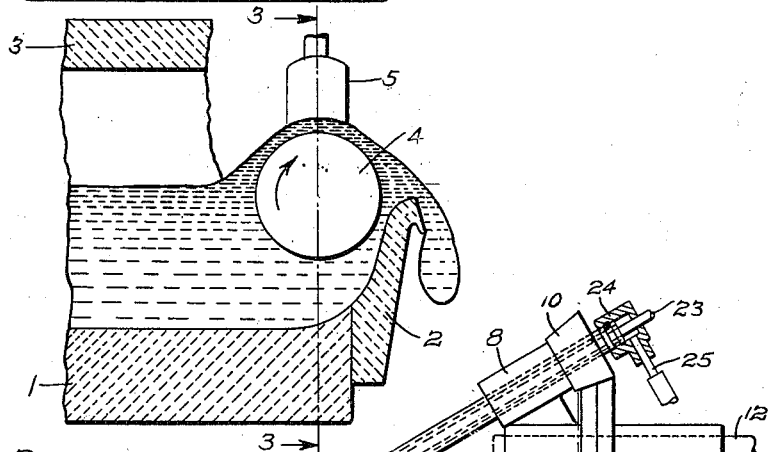
Figure 3:
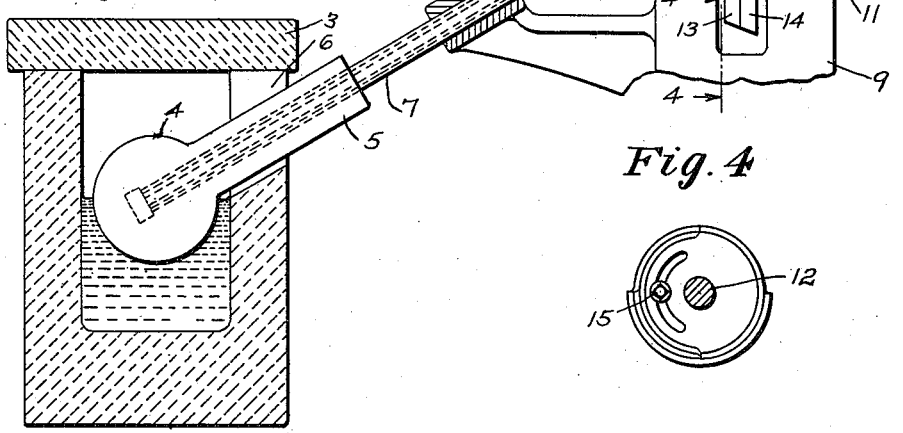
Figure 4:
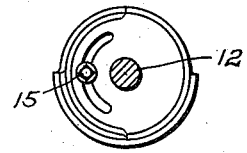

Figure 1 of the accompanying drawings is a plan view of the discharge end of a forehearth or outlet trough from a glass furnace or other glass container with the cover removed so as to show the propeller, which extends obliquely down into the glass. Fig. 2 is an elevation, in section taken on the plane indicated by the dotted line 2—2 on Fig. 1. Fig. 3 shows a sectional elevation of the fore-hearth or outlet trough on the plane indicated by the dotted line 3—3 on Fig. 2, this view showing in side elevation the propeller, its shaft and a mechanism by means of which the propeller may be rotated. Fig. 4 is an end view of the propeller shaft rotating mechanism, showing how it may be adjusted in order to vary the periods of rotation. Fig. 5 shows a sectional elevation of a modified form of the apparatus. Fig. 6 shows a plan view of this modification. Figs. 7 and 8 are plan views, showing two modifications, in which a plurality of propellers are employed.

The molten glass comprising the supply from which the required masses are discharged at intervals, flows from the furnace, melting pot or other container into a fore-hearth or trough 1 which at its discharge end is provided with a dam, lip or spout 2 at about the level of the supply of glass. A cover 3 is desirably placed on the top of the trough or fore-hearth. These parts are made of the usual refractory material.

The propeller 4 of the apparatus first illustrated is globular in shape and is more or less submerged in the molten glass in the fore-hearth or trough adjacent to the discharge spout. The stem 5 of the propeller extends obliquely through an opening 6 in the side wall of the fore-hearth or trough and is secured to the shaft 7. In the form shown the shaft is supported by bearings 8 on a standard 9, and the end of the shaft is provided with a conical friction pulley or roll 10. Supported by bearings 11 on the standard is a rotatable shaft 12 carrying a conical friction pulley. This friction pulley is illustrated as formed of two disks 13 and 14 mounted on the shaft and adjustably held together by a bolt 15. Each of these pulley disks has a segment of full diameter and a segment of lesser diameter, that is, each disk has a portion of its periphery cut away. By loosening the bolt the disks may be adjusted with relation to each other so that the length of the cut away portion with relation to the length of the full circumference of the pulley may be varied. During the rotation of the pulley, when the section of full diameter engages the roll 10 the propeller is rotated, but when the cut away portion reaches the roll 10 the rotation of the propeller ceases, this interval of cessation of rotation of the propeller being determined by the adjustment of the two disks above described. This mechanism for intermittently rotating the propeller is only one of many common forms of mechanisms which can be used for this purpose. When a continuous flow is desired, disks having an unrelieved periphery, or ordinary gears, may be employed for driving the propellers.

When the propeller is rotated, as in the direction indicated by the arrow on Fig. 2, a quantity of the glass is carried up on the upper, free side of the propeller by adhesion, and pushed over the lip of the discharge spout. The returning side of the propeller is disposed closely enough against some portion of the spout to prevent the free return of the glass on that side, so that most of the glass is wiped from the propeller and forced to pass over the lip of the spout. When the propeller stops the advancing action ceases and the glass which has been pushed over is allowed to settle in the form of a drop on the outside of the spout or dam. By regulating the speed of rotation of the propeller, and the intervals of its dwell, with proper relation to the viscosity of the glass, the formation of these extruded drops or masses of glass of the required size is repeated at the desired intervals.

Instead of inclining the propeller stem and shaft and having them pass through the side wall of the fore-hearth the propeller and its shaft may be arranged to rotate on a vertical axis, as shown in Fig. 5. In this case the propeller 16 is preferably made cylindrical, and its stem 17 passes upward through an opening in the cover 18. The propeller is disposed at one side of the discharge spout 19, as shown in Fig. 6, leaving a free delivery outlet from the advancing side of the propeller, and a working clearance on its returning side to prevent the free return of the glass.

When arranged in this manner and the propeller is rotated, as indicated by the arrow in Fig. 6, the desired amount of glass at the required intervals is forced over the lip 20 and discharged.

As shown in Figs. 7 and 8, two vertically disposed propellers 21 may extend downwardly and be partially submerged in the molten glass, one on each side of the center of the outlet spout 22. These may be spaced apart, as shown in Fig. 7, and be rotated, as indicated by the arrows, toward each other at suitable intervals so as to force the required amount of glass between them and out over the lip of the discharge spout. The outer returning sides of the propellers are disposed closely enough to the sides of the spout to prevent the free return of the glass on those sides. Or the propellers may be disposed nearer together, that is, so that there is little or no space between them, for the return of the glass, as shown in Fig. 8, and at the required intervals be rotated oppositely, as indicated by the arrows, so as to carrry the molten glass around their outer sides, and as the glass cannot pass freely back between them most of it will be extruded over the lip of the discharge spout.

Where a plurality of propellers are employed they may be geared together, or each may be separately driven like the single propeller shown in Fig. 3.

In view of the brittle character of the refractory material, preferably employed for these propellers, their shafts should be extended downwardly well into them, as indicated in Fig. 3. To prevent these lower ends of the shaft from being burned off by the intense heat, provision is made for the circulation of air from a compressor or other source of supply, through the shaft to its lower end. The shaft is therefore preferably made tubular, and is provided with a suitable longitudinal partition, or with a smaller interior return pipe 23, to provide for the return of the air, so as to maintain a circulation of cool air, and thus carrying away the heat from the pipe or shaft. To allow the turning movement of the pipe, a swiveling air connection 24 is provided having an inlet 25 connected with the air supply.

It may be desirable, in some instances, to provided severing means to cut the neck or thread of glass connnecting the supply in the furnace with the segregated mass which has passed over the lip. Such severing means are well known and may be applied to the mechanism of this invention by any skilled mechanic. One example of such a severing means arranged to be automatically actuated in timed relation with the discharge of segregated masses of glass, may be found in U. S. Patent No. 1,277,254, granted August 27, 1918, on an application by the present inventor.

This apparatus is very simple and its action can be easily regulated so that the required amount of glass will be discharged at the desired intervals. With the propellers arranged as shown their operating mechanisms are located at a distance from the heated parts of the apparatus so that they will not be affected by the heat and can be kept in good running condition and easily regulated.

Any of the discharge spouts or outlets may be surrounded by a heat conserving chamber like that shown in Fig. 5, in which the discharged glass is suspended and by which it is protected from chilling currents of air. The chamber may also be actively heated by nozzles or burners like that shown conventionally in that figure.

I claim as my invention:—

1. The combination with a container for molten glass having a discharge outlet, of a propeller supported for rotation in the glass within the container and means for intermittently rotating the propeller to propel by adhesion successive masses of the glass through the outlet.

2. The combination with a container for molten glass having a discharge outlet, of a propeller supported for rotation in the glass behind the outlet and at one side thereof, the wall of the container being adapted to deflect through the outlet glass propelled by the propeller, and means for intermittently rotating the propeller to discharge the glass through the outlet in successive masses.

3. The combination with a container for molten glass having a discharge outlet, of a plurality of propellers disposed on opposite sides of the outlet, and mechanism for intermittently rotating the propellers to propel the glass in successive masses through the outlet.

4. The combination, with a container for molten glass having a discharge outlet, of a plurality of propellers supported for rotation on substantially vertical axes in the glass behind the outlet, and on opposite sides thereof, and mechanism for intermittently rotating the propellers in opposite directions to propel successive masses of glass through the outlet, a free channel being provided for the forward flow of glass from those sides of the propellers which rotate toward the outlet and the channels on those sides of the propellers which rotate backwardly from the outlet, being obstructed to prevent the backward propulsion of the glass.

5. The combination with a container for molten glass having a discharge outlet over a dam, of a propeller supported for rotation in the glass behind the outlet, and means for intermittently rotating the propeller to propel successive masses of the glass over the dam through the outlet.

6. The combination with a container for molten glass, having a discharge outlet, of a propeller supported for rotation on a substantially vertical axis in the glass adjacent to and at one side of the outlet, and means for intermittently rotating the propeller whereby the glass is propelled in successive masses toward and through the outlet by one side of the propeller and is prevented from returning, to any substantial extent, on the opposite side of the propeller.

7. The combination with a container for molten glass, having a discharge outlet adapted to suspend a mass of discharged glass, of a heat conserving chamber substantially inclosing the said outlet, and surrounding said suspended mass, a propeller supported for rotation in the glass behind the outlet, and means for intermittently rotating the propeller to propel successive masses of the glass from the container through the said outlet into the said chamber.

8. The combination with a container for molten glass, having a discharge opening above the glass level, of a propeller supported for rotation in the glass within the container and means for intermittently rotating the propeller to propel by adhesion successive masses of glass through the outlet.

9. In an apparatus for separating molten glass into uniform masses having a container provided with an outlet, the combination of a rotatable member having a surface of revolution mounted in the container, and means for intermittently rotating the member to move glass toward the outlet by adhesion to the member.

10. The combination with a container for molten glass having an outlet above the glass level, of a rotatable member partially separating the glass adjacent the outlet from the main body of glass in the container, and means for rotating the member to raise the level of the glass on the outlet side of the member.

11. The combination with a container for molten glass having an outlet above the glass level, of a rotatable member partially separating the glass adjacent the outlet from the main body of glass in the container, and means for intermittently rotating the member to periodically raise the level of the glass on the outlet side of the member.

12. The combination with a container for molten glass having a discharge outlet, of a propeller supported for rotation in the glass behind the outlet, means for intermittently rotating the propeller to propel successive masses of the glass toward the outlet, and means to permit adjustment of the duration of the rotary periods of the propeller.

13. The combination with a container for molten glass having a discharge outlet, of a propeller within the container, means for intermittently actuating the propeller to cause a movement of glass toward the outlet, and means to permit adjustment of the duration of the active periods of the propeller.

14. The combination with a container for molten glass having a discharge outlet, of a propeller supported for rotation in the glass, and adapted to propel the glass to the outlet by adhesion, means for intermittently rotating the propeller to propel successive masses of glass toward the outlet on one side of the propeller, and arranged to prevent the glass from returning to any substantial extent on the other side of the propeller, and means to permit adjustment of the duration of the rotary period of the propeller.

Signed at Hartford, Conn., this 29th day of December, 1916.

KARL E. PEILER.